US012571653B2

(12) United States Patent
Tsubaki et al.

(10) Patent No.: US 12,571,653 B2
(45) Date of Patent: Mar. 10, 2026

(54) ANALOG METER READING SYSTEM AND METHOD

(71) Applicant: TOYOTA JIDOSHA KABUSHIKI KAISHA, Toyota (JP)

(72) Inventors: Yuta Tsubaki, Toyota (JP); Naoya Uchiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 18/458,505

(22) Filed: Aug. 30, 2023

(65) Prior Publication Data

US 2024/0151556 A1 May 9, 2024

(30) Foreign Application Priority Data

Nov. 7, 2022 (JP) ................................. 2022-178494

(51) Int. Cl.
*G01D 4/00* (2006.01)
*G06V 10/88* (2022.01)
*G06V 30/18* (2022.01)

(52) U.S. Cl.
CPC ......... *G01D 4/008* (2013.01); *G06V 30/1801* (2022.01); *G06V 2201/02* (2022.01)

(58) Field of Classification Search
CPC .......... G01D 4/008; G01D 5/03; G01D 7/002
See application file for complete search history.

(56) References Cited

U.S. PATENT DOCUMENTS

2019/0180487 A1* 6/2019 Abe ......................... G01B 3/18

FOREIGN PATENT DOCUMENTS

| JP | 2008-224376 A | | 9/2008 |
|----|---------------|---|--------|
| JP | 2019158748 A | * | 9/2019 |
| JP | 2020-160691 A | | 10/2020 |
| JP | 2020-181464 A | | 11/2020 |
| JP | 2022-77942 A | | 5/2022 |
| JP | 2022089389 A | * | 6/2022 |

OTHER PUBLICATIONS

JP-2019158748-A English Language Translation (Year: 2019).*
JP-2022089389-A English Language Translation (Year: 2022).*
JP-2019158748-A English Language Translation (Year: 2018).*

* cited by examiner

*Primary Examiner* — Steven Lim
*Assistant Examiner* — Jerold B Murphy
(74) *Attorney, Agent, or Firm* — Sughrue Mion, PLLC

(57) ABSTRACT

An analog meter reading system is applied to an analog meter provided with a scale and a pointer and reads a measured value of the analog meter. The analog meter reading system includes: a unique information acquisition unit that acquires unique information of the analog meter; an image acquisition unit that acquires an image of the analog meter for reading the measured value; a detection unit that detects a reference point on the scale and a pointer from the image; a rotation angle calculation unit that calculates a rotation angle of the pointer until a state in which the pointer points to the reference point changes to a state in which the pointer points to the measuring point based on the reference point and the pointer that are detected; and a measured value conversion unit that converts the rotation angle into the measured value using the unique information.

6 Claims, 5 Drawing Sheets

20

| |
|---|
| ~11 |
| UNIQUE INFORMATION ACQUISITION UNIT |
| ~12 |
| IMAGE ACQUISITION UNIT |
| ~13 |
| DETECTION UNIT |
| ~14 |
| ROTATION ANGLE CALCULATION UNIT |
| ~15 |
| MEASURED VALUE CONVERSION UNIT |

~40

FIG. 5
| IDENTIFICATION CODE | UNIQUE INFORMATION | MEASUREMENT RANGE INFORMATION | |
| --- | --- | --- | --- |
| | | MAXIMUM VALUE Mmax | MAXIMUM ROTATION ANGLE $\theta$ max |
| 111 | A | 500 | 270° |
| 112 | A | 500 | 270° |
| 113 | A | 500 | 270° |
| 114 | A | 500 | 270° |
| 245 | B | 1200 | 360° |
| 246 | B | 1200 | 360° |
| 247 | B | 1200 | 360° |
| 786 | C | 320 | 320° |
| 787 | C | 320 | 320° |
FIG. 6A
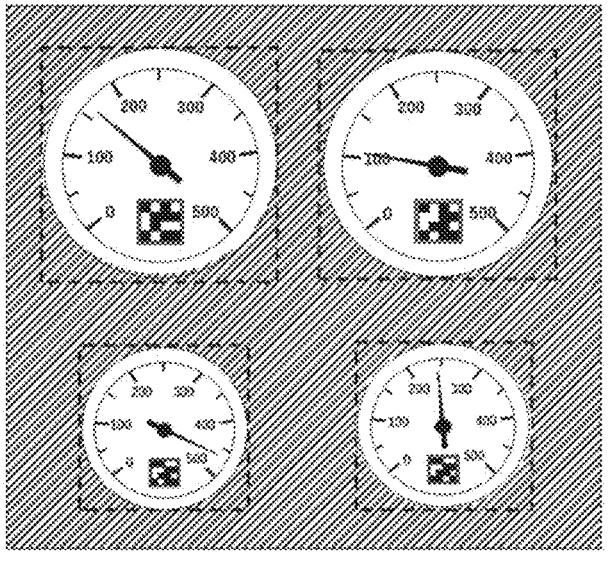
FIG. 6B
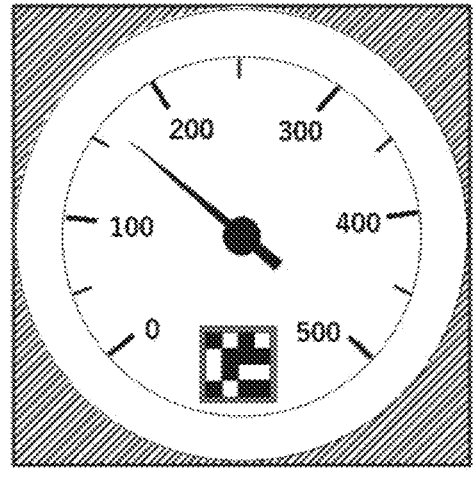

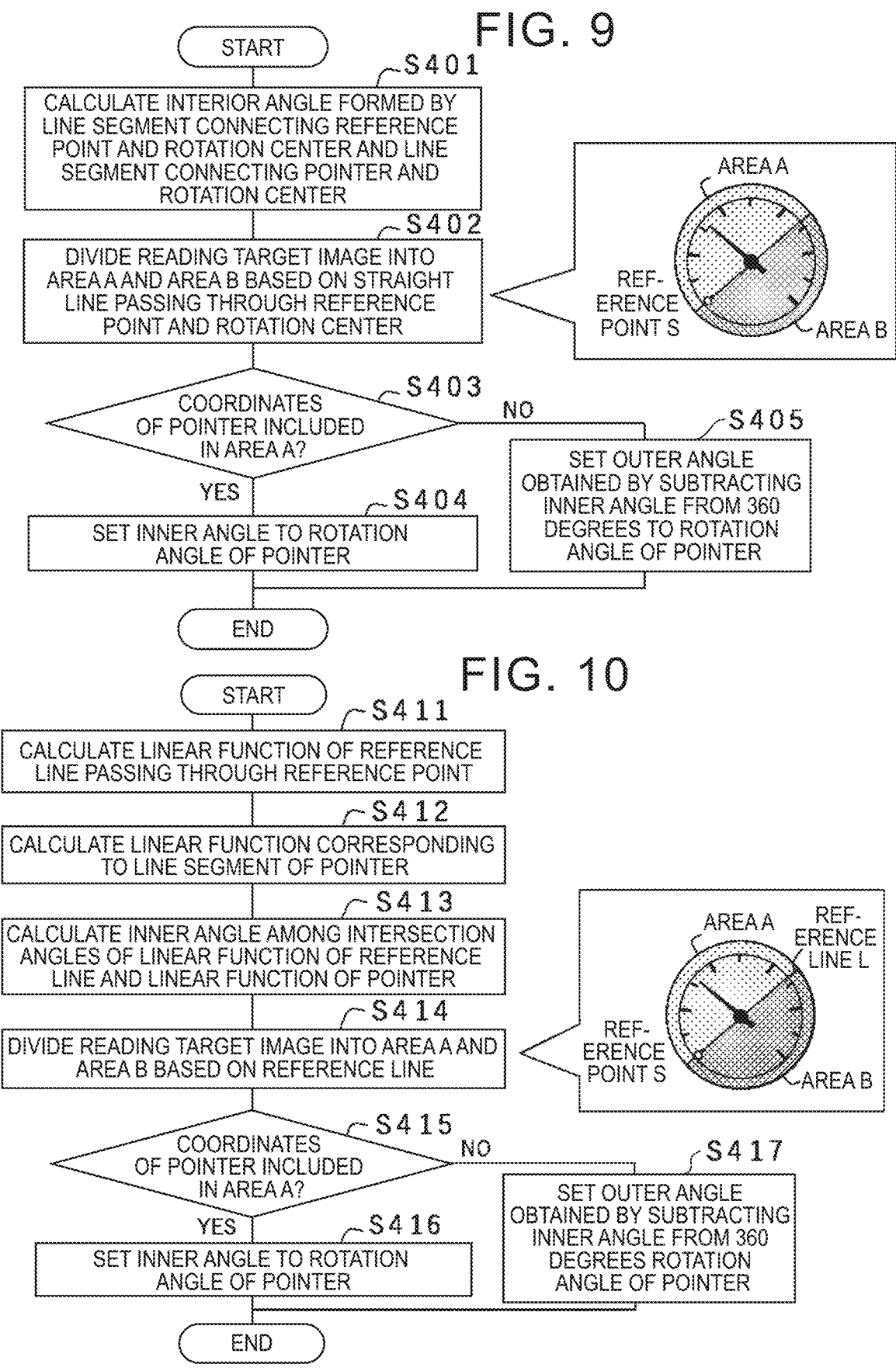

FIG. 9

START

CALCULATE INTERIOR ANGLE FORMED BY LINE SEGMENT CONNECTING REFERENCE POINT AND ROTATION CENTER AND LINE SEGMENT CONNECTING POINTER AND ROTATION CENTER ~S401

DIVIDE READING TARGET IMAGE INTO AREA A AND AREA B BASED ON STRAIGHT LINE PASSING THROUGH REFERENCE POINT AND ROTATION CENTER ~S402

AREA A
REF-ERENCE POINT S
AREA B

COORDINATES OF POINTER INCLUDED IN AREA A? ~S403

NO → SET OUTER ANGLE OBTAINED BY SUBTRACTING INNER ANGLE FROM 360 DEGREES TO ROTATION ANGLE OF POINTER ~S405

YES → SET INNER ANGLE TO ROTATION ANGLE OF POINTER ~S404

END

FIG. 10

START

CALCULATE LINEAR FUNCTION OF REFERENCE LINE PASSING THROUGH REFERENCE POINT ~S411

CALCULATE LINEAR FUNCTION CORRESPONDING TO LINE SEGMENT OF POINTER ~S412

CALCULATE INNER ANGLE AMONG INTERSECTION ANGLES OF LINEAR FUNCTION OF REFERENCE LINE AND LINEAR FUNCTION OF POINTER ~S413

DIVIDE READING TARGET IMAGE INTO AREA A AND AREA B BASED ON REFERENCE LINE ~S414

AREA A
REF-ERENCE LINE L
REF-ERENCE POINT S
AREA B

COORDINATES OF POINTER INCLUDED IN AREA A? ~S415

NO → SET OUTER ANGLE OBTAINED BY SUBTRACTING INNER ANGLE FROM 360 DEGREES ROTATION ANGLE OF POINTER ~S417

YES → SET INNER ANGLE TO ROTATION ANGLE OF POINTER ~S416

END

ANALOG METER READING SYSTEM AND METHOD

CROSS-REFERENCE TO RELATED APPLICATION

This application claims priority to Japanese Patent Application No. 2022-178494 filed on Nov. 7, 2022 incorporated herein by reference in its entirety.

BACKGROUND

1. Technical Field

The present disclosure relates to an analog meter reading system and method for reading a measured value of an analog meter based on an image of the analog meter captured by a camera.

2. Description of Related Art

Analog meters for measuring physical quantities such as a temperature, humidity, a pressure, a rotation speed, current, and voltage are installed in various factories and plants. The measured values of the analog meters are recorded and managed, and trends in consumption and environmental changes are grasped, for example.

Conventionally, as an operation of reading the measured value of the analog meter, an operator circulates to visually check the analog meter. However, when a large number of analog meters are installed in a factory, plant, or the like, the burden on the operator is significant. In addition, the operation of reading the measured value of the pointer that points between the scales may cause an error depending on the operator.

In recent years, a technique has been proposed to improve the efficiency of equipment inspection and monitoring work by automatically reading measured values from images of analog meters captured by a camera.

For example, Japanese Unexamined Patent Application Publication No. 2020-181464 (JP 2020-181464 A) proposes a system in which a measuring position of a pointer of an analog meter is determined by comparing an image of the analog meter captured by a camera and a classification model created in advance to read the measuring position. The classification model is an image of an analog meter provided with a scale over the entire circumference (360 degrees), in which the pointer is moved by one degree from zero degrees to 360 degrees.

SUMMARY

In the analog meter reading device of JP 2020-181464 A, it is necessary to create an analog meter classification model in advance. Images of the analog meter prepared for learning include images of the analog meter captured from the front and obliquely captured from various angles for each angle of the pointer. Then, it is necessary to capture images of the analog meters one by one such that the measured values of the analog meters can be captured. However, when an operator actually captures an image, there is no guarantee that the image can be captured under the same imaging conditions as the classification model. Therefore, in case of inconsistency with the classification model, an appropriate measured value cannot be acquired. The imaging conditions include, for example, a location where the analog meter is installed, the illuminance and direction of the light emitted from the surrounding environment of the installation location, etc. There is an issue that, when the entire analog meter is learned and pattern matching with the classification model is performed, the influence is particularly large.

The present disclosure has been made to solve such an issue, and provides an analog meter reading system and method that can accurately read the measured value of an analog meter while the influence by the imaging conditions is suppressed.

An analog meter reading system according to the present disclosure is an analog meter reading system that is applied to an analog meter provided with a scale disposed along a circumference and a pointer rotating around a predetermined rotation center and indicating a measuring point, and that reads a measured value of the analog meter, and includes: a unique information acquisition unit that acquires unique information of the analog meter; an image acquisition unit that acquires an image of the analog meter for reading the measured value; a detection unit that detects a reference point on the scale and a pointer from the image; a rotation angle calculation unit that calculates a rotation angle of the pointer until a state in which the pointer points to the reference point changes to a state in which the pointer points to the measuring point based on the reference point and the pointer that are detected; and a measured value conversion unit that converts the rotation angle into the measured value using the unique information. With such a configuration, it is possible to detect the reference point of the scale and the pointer from the image of the analog meter and read the measured value. Since the reference point on the scale and the pointer of the analog meter are detected, the influence of the image capturing conditions can be reduced and the measured value can be read with high accuracy.

Here, the unique information is associated with measurement range information of the analog meter. With such a configuration, even when the maximum rotation angle and the measurement range differ depending on the analog meter, the measured value can be obtained based on the unique information.

Here, the rotation angle calculation unit acquires a rotation center of the analog meter, the reference point, and a center point of the pointer, and calculates the rotation angle.

Further, the rotation angle calculation unit acquires a reference line passing through the reference point and calculates the rotation angle from an intersection angle with a straight line corresponding to the pointer.

An analog meter reading method according to the present disclosure is an analog meter reading method that is applied to an analog meter provided with a scale disposed along a circumference and a pointer rotating around a predetermined rotation center and indicating a measuring point, and that reads a measured value of the analog meter, and includes: a unique information acquisition step of acquiring unique information of the analog meter; an image acquisition step of acquiring an image of the analog meter for reading the measured value; a detection step of detecting a reference point on the scale and a pointer from the image; a rotation angle calculation step of calculating a rotation angle of the pointer until a state in which the pointer points to the reference point changes to a state in which the pointer points to the measuring point based on the reference point and the pointer that are detected; and a measured value conversion step of converting the rotation angle into the measured value using the unique information. With such a configuration, it is possible to detect the reference point of the scale and the pointer from the image of the analog meter and read the measured value. Since the reference point on the scale and the pointer of the analog meter are detected, the influence of the image capturing conditions can be reduced and the measured value can be read with high accuracy.

Here, the rotation angle calculation step acquires a rotation center of the analog meter, the reference point, and a center point of the pointer, and calculates the rotation angle.

Further, the rotation angle calculation step acquires a reference line passing through the reference point and calculates the rotation angle from an intersection angle with a straight line corresponding to the pointer.

According to the present disclosure, an analog meter reading system and method that can accurately read the measured value of an analog meter while the influence by the imaging conditions is suppressed can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is an example of unique information in the first embodiment;

FIG. 6A is a diagram for explaining image processing by an image acquisition unit in the first embodiment, and FIG. 6A is an overall image;

FIG. 6B is a diagram for explaining the image processing by the image acquisition unit in the first embodiment, and FIG. 6B is a reading target image;

FIG. 9 is a flowchart showing a processing procedure of a rotation angle calculation step in the first embodiment; and FIG. 10 is a flowchart showing a processing procedure of a rotation angle calculation step in a second embodiment.

DETAILED DESCRIPTION OF EMBODIMENTS

First Embodiment

Figure 1:
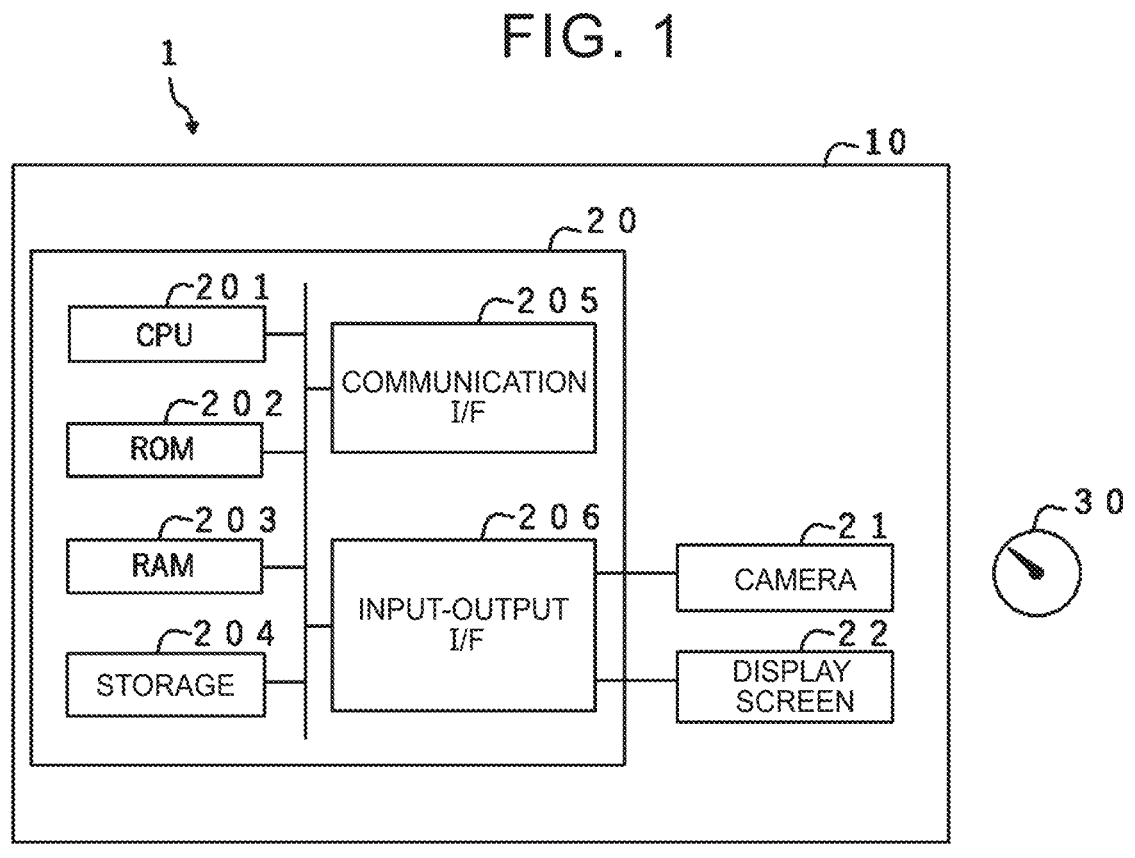
FIG. 1 is a block diagram showing a hardware configuration of an analog meter reading system according to a first embodiment.

An analog meter reading system and method according to a first embodiment of the present disclosure will be described with reference to FIGS. 1 to 9. FIG. 1 is a block diagram showing a hardware configuration of an analog meter reading system 1 according to the first embodiment. The analog meter reading system 1 according to the present embodiment includes a mobile terminal 10 provided with an imaging function, such as a smart phone or a tablet. As shown in FIG. 1, the mobile terminal 10 includes a processor 20, a camera 21, and a display screen 22. The analog meter reading system 1 reads a measured value indicated by an analog meter 30 based on an image of the analog meter 30 captured by the camera 21.

In the first embodiment, the analog meter reading system 1 can be used by activating a dedicated application installed in the mobile terminal 10 in advance.

Figure 2:
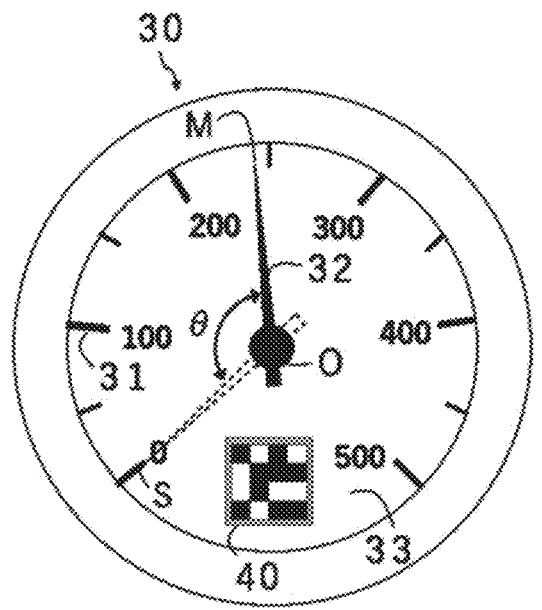
FIG. 2 is a front view schematically showing an analog meter according to the first embodiment.

Here, the configuration of the analog meter 30 to which the analog meter reading system 1 is applied will be described. FIG. 2 is a front view schematically showing the analog meter 30. The analog meter 30 includes a scale 31 that is disposed along a circumference and a pointer 32 that points to a measuring point M around a predetermined rotation center O. In the present embodiment, the analog meter 30 to which the present embodiment is applied includes an identification code 40 disposed on a dial 33 of the analog meter 30.

The processor 20 is a so-called microcomputer, and is configured to include a central processing unit (CPU) 201, a read-only memory (ROM) 202, a random access memory (RAM) 203, a storage 204 as a storage unit, a communication interface 205, and an input-output interface 206. Each configuration is communicatively connected to each other.

The CPU 201 is a central processing unit and executes various programs. That is, the CPU 201 reads a program from the ROM 202 or the storage 204 and executes the program using the RAM 203 as a work area. The CPU 201 controls the above components and performs various calculations in accordance with programs recorded in the ROM 202 or the storage 204.

The storage 204 stores the unique information of the analog meter 30 corresponding to the identification code 40 and measurement range information in association with each other.

Further, the storage 204 stores a learned model for analog meter detection that detects the analog meter 30 from the entire image including the entire analog meter 30 captured by the camera 21. The learned model for analog meter detection is a model obtained by subjecting an image that includes a plurality of the analog meters 30 and that is acquired for machine learning to machine learning of feature quantities, such as shape patterns of the analog meters 30.

Further, the storage 204 also stores a learned model for scale detection that detects the scale 31 from the image of the analog meter 30 for reading the measured value of the analog meter 30 (the image will be hereinafter referred to as "reading target image"). The learned model for scale detection is, for example, a model obtained by subjecting the image including the entire analog meter 30 to the machine learning of the feature quantity such as the shape pattern of the scale 31.

Further, the storage 204 stores a learned model for pointer detection that detects the pointer 32 from the reading target image of the analog meter 30. The learned model for pointer detection is a model obtained by subjecting an image including the entire analog meter 30 to the machine learning of the feature quantity such as the shape pattern of the pointer 32.

The ROM 202 stores various programs and various types of data. The ROM 202 temporarily stores programs or data as a work area. The storage 204 is configured by a hard disk drive (HDD) or a solid state drive (SSD) and stores various programs including an operating system and various types of data.

The communication interface 205 is an interface for communicating with a server and other devices (not shown), and uses standards such as long term evolution (LTE), fiber distributed data interface (FDDI), and Wi-Fi (registered trademark), for example.

The camera 21 as an imaging unit and the display screen 22 as a display unit are connected to the input-output interface 206.

Figure 3:
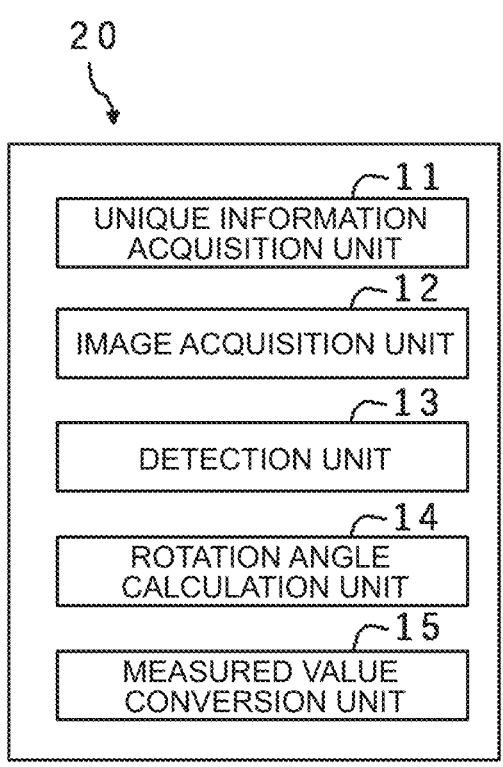
FIG. 3 is a block diagram showing a functional configuration of a processor according to the first embodiment.

The analog meter reading system 1 uses the processor 20 to read the measured value at the measuring point M indicated by the pointer 32 based on the image of the analog meter 30 captured by the camera 21. FIG. 3 is a block diagram showing the functional configuration of the processor 20. The processor 20 calculates a rotation angle θ of the pointer 32 until a state in which the pointer 32 of the analog meter 30 points to a reference point S on the scale 31 (a state in which the pointer 32 is indicated by a broken line in FIG. 2) changes to a state in which the pointer points to the measuring point M (a state in which the pointer 32 is indicated by a solid line in FIG. 2) (this rotation angle will be hereinafter simply referred to as "rotation angle θ of the pointer 32"). Then, the calculated rotation angle θ of the pointer 32 is converted into a measured value using the unique information of the analog meter 30. The processor 20 has the functional configuration shown in FIG. 3 so as to implement the above functions. Note that each functional configuration is realized in a manner such that the CPU 201 reads and executes a program stored in the storage 204.

As shown in FIG. 3, the processor 20 has a functional configuration including a unique information acquisition unit 11, an image acquisition unit 12, a detection unit 13, a rotation angle calculation unit 14, and a measured value conversion unit 15.

The unique information acquisition unit 11 acquires unique information by reading the identification code 40 disposed on the dial 33 of the analog meter 30. FIG. 5 is an example of the unique information. The unique information is associated with measurement range information for converting the rotation angle θ of the pointer 32 of the analog meter 30 into the measured value. The measurement range information is, for example, the maximum value of the measured value of the analog meter 30 and the rotation angle θ of the pointer 32 when the measured value of the analog meter 30 reaches the maximum value (hereinafter referred to as "maximum rotation angle θmax"). The measurement range information may be the amount of change in the measured value per unit rotation angle of the pointer 32. In the example where the identification code is 111, the unique information is A, and as the measurement range information of A, the maximum rotation angle θmax is acquired as 270°. The measurement range information is stored in the storage 204 in association with the unique information obtained by reading the identification code 40, and is acquired based on the unique information. In this example, the identification code is associated with the unique information. However, the measurement range information may be read from the identification code 40. Note that the measurement range information can also be set by inputting the information by the operator in advance.

Figure 4:
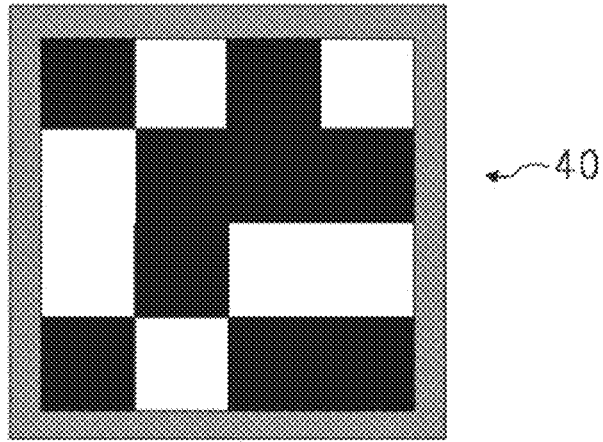
FIG. 4 is a front view schematically showing an identification code according to the first embodiment.

FIG. 4 is a front view schematically showing the identification code 40. The identification code 40 is a black and white binary marker that uniquely identifies the analog meter 30. The identification code 40 is desirably placed at a position where the identification code 40 can be acquired together from the captured entire image of the analog meter 30, and is placed in the analog meter 30 or near the analog meter 30. As a method of disposing the identification code 40, it is efficient to affix a sticker when the analog meter 30 is installed. However, the identification code 40 may be printed in advance at the time of manufacture. Displaying the bits of the identification code 40 in a large size makes it possible to read the image even when the image is captured from a distance. However, the identification code 40 may also be an augmented reality (AR) marker or a quick response (QR) code (registered trademark). Also, the identification code 40 may be a model code written on the dial 33 of the analog meter 30.

Further, the image acquisition unit 12 detects the analog meter 30 from the entire image including the analog meter 30 captured by the camera 21 using the learned model for analog meter detection stored in the storage 204. Then, the image of the analog meter 30 detected from the entire image is clipped, and the read image of the analog meter 30 is acquired.

FIGS. 6A, 6B are diagrams for explaining image processing by the image acquisition unit 12. FIG. 6A shows the entire image including the analog meters 30, and FIG. 6B shows the reading target image of the analog meter 30. The image acquisition unit 12 extracts rectangular frames along the analog meters 30 as indicated by the broken lines in FIG. 6A. The reading target image of the analog meter 30 shown in FIG. 6B is acquired by clipping the entire image including the analog meter 30 with this rectangular frame. With the above, even when the images of the multiple analog meters 30 are captured at once, it is possible to acquire the reading target image of the analog meter 30 for each of the multiple analog meters 30.

The detection unit 13 detects the reference point S on the scale 31 and the pointer 32 from the reading target image using the learned model for scale detection and the learned model for pointer detection that are stored in the storage 204. In the present embodiment, the reference point S is the starting point of the scale 31. Since the starting point is 0, the reference point S is specified and detected by detecting "0".

Further, the detection unit 13 creates a virtual orthogonal coordinate system for the reading target image of the analog meter 30. Specifically, the lower left point of the reading target image of the analog meter 30 is set as an origin (0, 0), the horizontal direction is set as an X axis (horizontal axis), and the perpendicular direction perpendicular to the X axis is set as a Y axis (vertical axis) to create a virtual orthogonal coordinate system. Then, position coordinates that are position information of the detected reference point S and pointer 32 on the image are acquired. Furthermore, the positional coordinates of the center point of the reading target image acquired as the position information on the image of the rotation center O of the analog meter 30.

Figure 7:
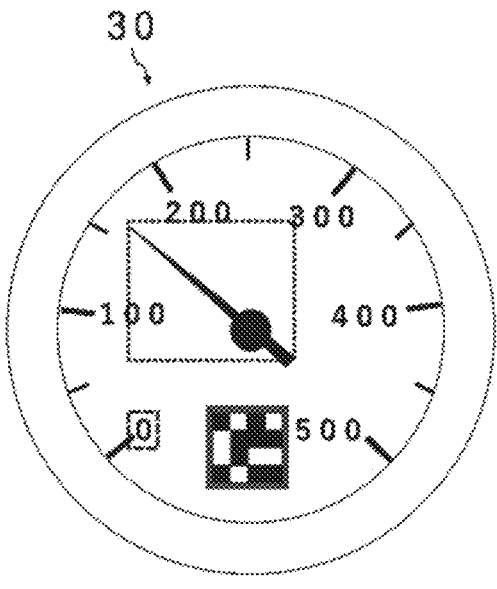
FIG. 7 is a diagram for explaining image processing by a detection unit according to the first embodiment.

FIG. 7 is a diagram for explaining image processing by the detection unit 13. The detection unit 13 extracts respective rectangular frames along the "0" of the scale 31 and the pointer 32, as indicated by broken lines in FIG. 7. Then, the positional coordinates of the center points of the rectangular frames are acquired as the positional information of the reference point S and the pointer 32 on the image.

Here, similarly to the reference point S and the pointer 32, a learned model for detecting the rotation center O of the analog meter 30 may be created and the rotation center O may be detected using the learned model. In this case, as with the reference point S and the pointer 32, the position coordinates of the center point of the rectangular frame along the rotation center O may be obtained as the position information of the rotation center O on the image.

The rotation angle calculation unit 14 calculates the rotation angle θ of the pointer 32 using the rotation center O of the analog meter 30 and the position coordinates of the reference point S on the scale 31 and the pointer 32 that are acquired by the detection unit 13.

The measured value conversion unit 15 converts the rotation angle θ of the pointer 32 calculated by the rotation angle calculation unit 14 into a measured value of the analog meter 30. Specifically, the rotation angle θ of the pointer 32 is converted into a measured value using the maximum value of the measured value of the analog meter 30 and the maximum rotation angle θmax of the pointer 32 that are the measurement range information associated with the unique information of the analog meter 30 stored in the storage 204. The measured value conversion unit 15 calculates the amount of change in the measured value per unit rotation angle of the pointer 32 using the maximum value and the maximum rotation angle θmax, and multiplies the calculated rotation angle θ of the pointer 32 by the calculated amount of change so as to convert the rotation angle θ of the pointer 32 into the measured value.

Figure 8:
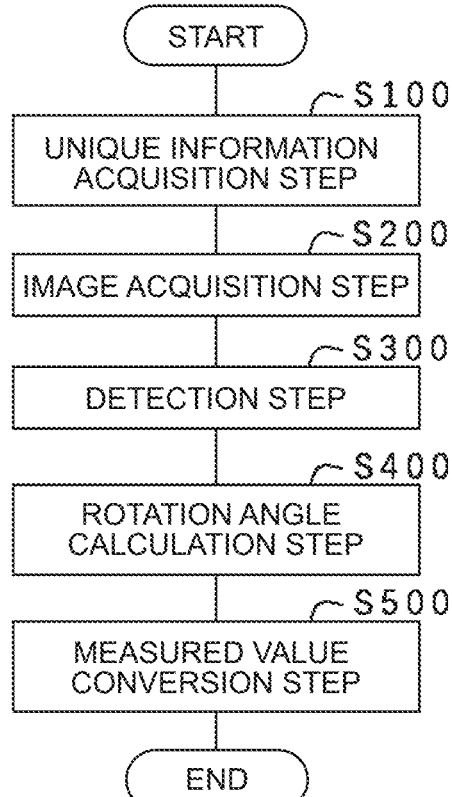
FIG. 8 is a flowchart showing a processing procedure of an analog meter reading method according to the first embodiment.

Next, an analog meter reading method executed by the analog meter reading system 1 will be described with reference to FIGS. 8 and 9. FIG. 8 is a flowchart showing a processing procedure of the analog meter reading method. As shown in FIG. 8, the analog meter reading method includes a unique information acquisition step (step 100, hereinafter "step" is abbreviated as "S"), an image acquisition step (S200), a detection step (S300), a rotation angle calculation step (S400), and a measured value conversion step (S500), and these steps are executed in order.

In the unique information acquisition step (S100), the unique information acquisition unit 11 acquires the unique information by reading the identification code 40 disposed on the dial 33 of the analog meter 30.

In the image acquisition step (S200), the image acquisition unit 12 acquires the reading target image of the analog meter 30 from the entire image including the analog meter 30 captured by the camera 21 using the learned model for analog meter detection.

In the detection step (S300), the detection unit 13 extracts the reference point S on the scale 31 and the pointer 32 from the reading target image of the analog meter 30 using the learned model for scale detection and the learned model for pointer detection that are stored in the storage 204, and acquires the position coordinates that are the position information of the reference point S and the pointer 32 on the image. Furthermore, the position coordinates of the center point of the reading target image are acquired as the position information on the image of the rotation center O of the analog meter 30.

In the rotation angle calculation step (S400), the rotation angle calculation unit 14 calculates the rotation angle θ of the pointer 32 using the rotation center O of the analog meter 30 and the position coordinates of the reference point S on the scale 31 and the pointer 32 that are acquired in the detection step (S300). FIG. 9 is a flowchart showing a processing procedure executed by the rotation angle calculation unit 14 in the rotation angle calculation step (S400). First, in S401, an interior angle (an angle of 180 degrees or less) formed by a line segment connecting the position coordinates of the reference point S and the rotation center O and a line segment connecting the pointer 32 and the position coordinates of the rotation center O is calculated. In S402, the reading target image is divided into two areas, an area A and an area B, based on a straight line passing through the position coordinates of the reference point S and the rotation center O. In S403, an area including the position coordinates of the pointer 32 is specified, and when the position coordinates of the pointer 32 are included in the area A, the process proceeds to S404, the inner angle is set as the rotation angle θ of the pointer 32, and the process ends. In S403, when the position coordinates of the pointer 32 are included in the area B, the process proceeds to S405, and an angle (outer angle) obtained by subtracting the inner angle from 360 degrees is set as the rotation angle θ of the pointer 32, and the process ends.

Returning to FIG. 8, in the measured value conversion step (S500), the measured value conversion unit 15 converts the rotation angle θ of the pointer 32 calculated in the rotation angle calculation step (S400) into the measured value of the analog meter 30 based on the measurement range information associated with the unique information stored in the storage 204.

According to the analog meter reading system and method of the first embodiment, the reference point S on the scale 31 and the pointer 32 can be detected using the scale learned model in which the characteristics of the scale 31 are learned in advance and the pointer learned model in which the characteristics of the pointer 32 are learned in advance. The rotation angle θ of the pointer 32 is calculated based on the detected scale 31 and pointer 32. In the case of the learned model in which the rotation angle θ of the pointer 32 of the analog meter 30 is learned, there has been an issue that the accuracy is degraded due to disturbances such as the image capturing angle and light. In this respect, the scale 31 and the pointer 32 are smaller than the entire meter and are less susceptible to disturbances, whereby the rotation angle θ of the pointer 32 can be detected with high accuracy.

Second Embodiment

An analog meter reading system and method according to a second embodiment of the present disclosure will be described with reference to FIG. 10. In addition, the same sign is assigned to the structure substantially similar to the first embodiment, and the description thereof will be omitted. The system configuration of the analog meter reading system 1 according to the second embodiment and the functional configuration of the processor 20 are substantially the same as those of the analog meter reading system 1 according to the first embodiment.

In the second embodiment, the unique information acquisition unit 11 acquires the rotation angle θ of the analog meter 30 in addition to the unique information of the analog meter 30 from the identification code 40 attached near the analog meter 30. Here, the rotation angle θ of the analog meter 30 acquired from the identification code 40 is the amount of displacement that inclines with respect to the normal position of the analog meter 30 when an image is captured. The rotation angle θ is acquired in a plane on a two-dimensional dial. Specifically, the rotation angle θ is acquired from the inclination of a line segment connecting two points with large Y coordinates among the position coordinates of the four corners of the identification code with respect to the orthogonal coordinate system.

Further, the detection unit 13 detects the line segment of the pointer 32. Specifically, for the rectangular frame of the pointer 32 detected by the detection unit 13, a line segment corresponding to the pointer 32 is detected using an OpenCV (HoughLines) function. Then, the rotation angle calculation unit 14 acquires a reference line L that passes through the reference point S on the scale 31 set based on the rotation angle θ of the analog meter 30 in advance and the rotation center O of the analog meter 30.

FIG. 10 is a flowchart showing a processing procedure executed by the rotation angle calculation unit 14 in the rotation angle calculation step according to the second embodiment (S400). First, in S411, a linear function of the reference line L passing through the reference point S is calculated. In S412, a straight line function corresponding to the line segment of the pointer 32 detected by the detection unit 13 is calculated. In S413, an internal angle (an angle of 180 degrees or less) is calculated among the intersection angles of the linear function of the reference line L and the linear function of the pointer 32. In S414, the reading target image is divided into two areas, the area A and the area B, based on the reference line L. In S415, an area including the position coordinates of the pointer 32 is specified, and when the position coordinates of the pointer 32 are included in the area A, the process proceeds to S416, the inner angle is set as the rotation angle θ of the pointer 32, and the process ends. In S415, when the position coordinates of the pointer 32 are included in the area B, the process proceeds to S417, and an angle (outer angle) obtained by subtracting the inner angle from 360 degrees is set as the rotation angle θ of the pointer 32, and the process ends.

According to the analog meter reading system 1 and the analog meter reading method of the second embodiment, the same effects as those of the first embodiment can be achieved. Further, the reference line L passing through the reference point S on the scale 31 and the rotation center O of the analog meter is obtained, instead of calculating the rotation center of the analog meter 30 from the center point of the image of the reading target area. Then, a crossing angle between the linear function of the reference line L and the linear function corresponding to the pointer 32 is converted into a measured value.

With such a configuration, even when an image of the analog meter 30 cannot be captured horizontally with respect to the ground, errors due to imaging conditions can be suppressed, and the measured value of the analog meter 30 can be read with high accuracy.

OTHER EMBODIMENTS

In the analog meter reading system and method according to the first embodiment can be used by activating a dedicated application installed in the mobile terminal 10 in advance. Instead of the above, a configuration may be adopted in which the operator only captures an image of the analog meter 30 and transmits the image to a general computer provided with a processor and a memory as a system administrator terminal using a smartphone or a tablet, and in the computer to which the image is transmitted, various programs are executed to execute processes of acquisition of the unique information, acquisition of images, detection, calculation of the rotation angle, and conversion of the measured value. Further, in this case, the processing result may be transmitted to the smartphone or tablet of the operator.

It should be noted that the present disclosure is not limited to the above embodiment, and can be appropriately modified without departing from the spirit thereof, whereby the present disclosure can be implemented in various forms.

What is claimed is:

1. An analog meter reading system that is applied to an analog meter provided with a scale disposed along a circumference and a pointer rotating around a predetermined rotation center and indicating a measuring point, and that reads a measured value of the analog meter, the analog meter reading system comprising:

a unique information acquisition unit that acquires unique information of the analog meter by reading an identification code located at the analog meter, wherein the unique information includes a rotation angle which is an amount of displacement that inclines with respect to a normal position of the analog meter on a two-dimensional dial of the analog meter;

an image acquisition unit that acquires an image that includes the analog meter and the identification code, for reading the measured value;

a detection unit that detects a reference point on the scale, a pointer, a rotation center, and a line segment of the pointer from the image;

a rotation angle calculation unit that calculates a linear function of a reference line passing through the reference point, a straight line function corresponding to the line segment of the pointer, and a rotation angle of the pointer until a state in which the pointer points to the reference point changes to a state in which the pointer points to the measuring point based on the reference point and the pointer that are detected; and a measured value conversion unit that converts the rotation angle into the measured value using the unique information, wherein the rotation angle calculation unit is configured to calculate the rotation angle of the pointer from an intersection angle of the linear function of the reference line and the linear function of the pointer, calculate an inner angle of the intersection angle, divide the image into a first area and a second area based on the reference line, determine whether coordinates of the pointer are included in the first area, and when the coordinates of the pointer are included in the first area, set the inner angle as the rotation angle of the pointer, and when the coordinates of the pointer are not included in the first area, set an outer angle, which is obtained by subtracting the inner angle from 360 degrees, as the rotation angle of the pointer.

2. The analog meter reading system according to claim 1, wherein the unique information is associated with measurement range information for converting the rotation angle of the pointer of the analog meter into the measured value.

3. The analog meter reading system according to claim 2, wherein the detection unit detects the reference point, the pointer, and the rotation center from the image using at least one learned model stored in a storage, and wherein the measured value conversion unit converts the rotation angle of the pointer into the measured value of the analog meter using a maximum value of the analog meter and a maximum rotation angle of the pointer that are measurement range information included with the unique information obtained from the identification code.

4. An analog meter reading method that is applied to an analog meter provided with a scale disposed along a circumference and a pointer rotating around a predetermined rotation center and indicating a measuring point, and that reads a measured value of the analog meter, the analog meter reading system comprising:

a unique information acquisition step of acquiring unique information of the analog meter by reading an identification code located at the analog meter, wherein the unique information includes a rotation angle which is an amount of displacement that inclines with respect to a normal position of the analog meter on a two-dimensional dial of the analog meter;

an image acquisition step of acquiring an image that includes the analog meter and the identification code, for reading the measured value;

a detection step of detecting a reference point on the scale, a pointer, a rotation center, and a line segment of the pointer from the image;

a rotation angle calculation step of calculating a linear function of a reference line passing through the reference point, a straight line function corresponding to the line segment of the pointer, and a rotation angle of the pointer until a state in which the pointer points to the reference point changes to a state in which the pointer points to the measuring point based on the reference point and the pointer that are detected; and a measured value conversion step of converting the rotation angle into the measured value using the unique information, wherein the rotation angle calculation step includes calculate the rotation angle of the pointer from an intersection angle of the linear function of the reference line and the linear function of the pointer, calculate an inner angle of the intersection angle, divide the image into a first area and a second area based on the reference line, determine whether coordinates of the pointer are included in the first area, and when the coordinates of the pointer are included in the first area, sets the inner angle as the rotation angle of the pointer, and when the coordinates of the pointer are not included in the first area, set an outer angle, which is obtained by subtracting the inner angle from 360 degrees, as the rotation angle of the pointer.

5. The analog meter reading method according to claim 4, wherein the unique information is associated with measurement range information for converting the rotation angle of the pointer of the analog meter into the measured value.

6. The analog meter reading method according to claim 5, wherein the detection step detects the reference point, the pointer, and the rotation center from the image using at least one learned model stored in a storage, and wherein the measured value conversion step converts the rotation angle of the pointer into the measured value of the analog meter using a maximum value of the analog meter and a maximum rotation angle of the pointer that are measurement range information included with the unique information obtained from the identification code.

\* \* \* \* \*